Sept. 7, 1965  R. W. GOTCH  3,205,340
WELDING OF TUBES
Filed March 15, 1963
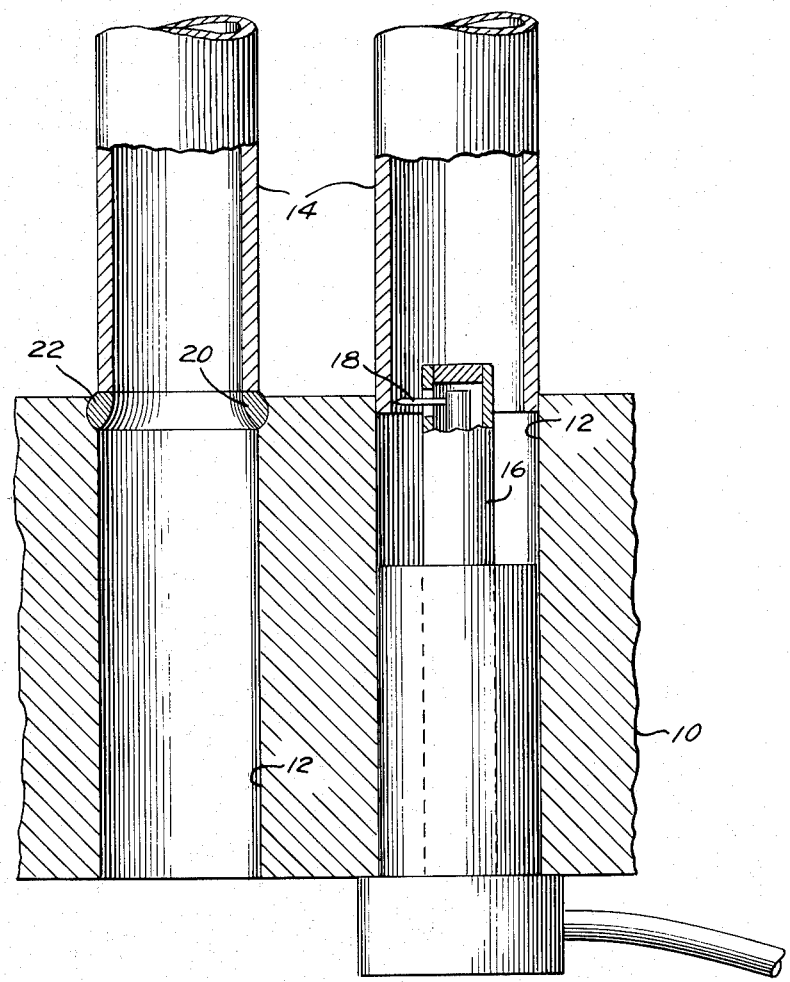
INVENTOR.
RONALD WILLIAM GOTCH
BY
ATTORNEY

United States Patent Office 3,205,340
Patented Sept. 7, 1965

3,205,340
WELDING OF TUBES
Ronald William Gotch, Ashford, Middlesex, England, assignor to Foster Wheeler Corporation, New York, N.Y., a corporation of New York
Filed Mar. 15, 1963, Ser. No. 265,449
Claims priority, application Great Britain, Mar. 20, 1962, 10,678/62
5 Claims. (Cl. 219—137)

This invention relates to welding of tubes to tub-plates, or tube sheets, of the typ used, for example, in heat exchangers.

I have successfully developed a technique for welding tubes to a tube-plate from the inside of the tubes which has solved the difficult problem of access when, as is not unusual in modern practice, a large number of small and closely-pitched tubes have to be welded. Techniques heretofore developed for this purpose have been concerned with butt-welding tubes to the tube-plate, this having the advantage that it enables a relatively thin tube-plate to be used even when the pressure to which it is subjected is high.

In the present application, I am concerned more with the ability to cut out a tube which may have become faulty through corrosion or for any other reason, and to replace it easily. This ability outweighs the advantage to be obtained from the use of a tube-plate of reduced thickness.

According to the invention, tubes are connected to tube-plates by accurately locating them a short distance into holes in the tube-plate and fusion welding them from the inside by an inert gas shielded electric arc process. The location of the tubes within the tube-plate holes is critical to ensure satisfactory results.

The tubes should provide a close fit within the holes in the tube-plate and preferably are mechanically expanded after having been inserted, but prior to location. It also is advisable to protect the outside of the tubes against oxidation during welding in the region of the weld, and this is effected by shielding the area of the weld by means of an inert gas such as argon.

The preferred method or procedure will now be described with reference to the accompanying drawing, which is a side elevation partly in cross-section showing the method of the invention and a tube-to-tube sheet weld formed by the method.

The drawing shows a heat exchanger tube-plate 10 having a number of holes 12 the diameters of which are equal to the external diameter of the tubes 14 to be attached to the tube-plate. The holes are drilled and reamed to receive the ends of the tubes which have been cleaned to remove dirt and oxide films. The tube to be welded is inserted a short way, perhaps ¼ inch, into its hole and is expanded by means of a drift to secure a tight joint. It is then drawn back from the inside of the hole until its penetration into the tube plate is that which will give the best weld. Since the tube has been expanded prior to being drawn back, it can be aligned with far greater accuracy. The tightness of fit resulting from the expansion still permits movement of the tube under force but avoids changes in position and excessive movement beyond the desired alignment. This is governed by the size of the tube, and in general, the penetration should be such that the penetration of the tube into the tube sheet after the tube has been partially withdrawn is approximately equal to the thickness of the wall of the tube. In the case of a 1¼ inch outside diameter x 12 S.W.G. tube, the pentration is ⅛ inch. Since the wall thickness of a 12 S.W.G. tube is on the average ⅛ of an inch, the penetration is equal to the wall thickness of the tube. An internal welding torch shown diagrammatically at 16 which can, for example, be of the kind with which my copending patent application, Serial No. 10,956 (now Patent No. 3,084,243 granted April 2, 1963), filed February 25, 1960, is concerned, is then inserted in the hole in the plate so that its electrode 18 is slightly below the surface of the tube plate 10 intermediate the surface and the free end of the tube. The welding is effected by rotating the electrode about the axis of the tube.

The welding can be effected with the axis of the tube at any angle relative to the horizontal. When butt-welding a tube to another tube or to a tubular stub, difficulties are frequently encountered due to drooping of the molten weld pool, these difficlties becoming greater as the diameter and the thickness of the tube increase. They are much alleviated when operating in accordance with the invention, the weld pool assuming a shape such as is shown at 20 in the drawing.

The pool 22 which is formed at the outside is so small as to make the use of a welding flux unnecessary but it is advisable to provide some form of protection against oxidization, for example, by means of an inert gas such as argon.

Apart from easing the problem of obtaining a good weld, the invention eases the problem of replacement of a tube. This is particularly the case with straight tubes. In the case of a tube which has failed through corrosion, the weld metal at one end of the tube can be drilled out with an end mill type of cutter until the tube parts company with the tube plate. When a similiar operation has been performed at the other end of the tube, the tube can be drifted through the plate. Alternatively, the tube can be cut through immediately beyond the tube plate by means of an internal tube cutter before the weld metal is drilled out. In the case of a tube which has burst, the tube may tend to jam when the burst part reaches the tube plate. This can be overcome by splitting the tube axially by means of a cold chisel inserted through the hole in the tube plate.

It will be appreciated that the tube plate needs no weld preparation except reaming of the holes to ensure a good fit of the tubes. This is of particular advantage when a tube has to be replaced and machining such as is required, for example, to provide a welding stub on the tube plate becomes a difficult operation. It will also be appreciated that in the case of straight tubes, a tube can be removed and a new tube put in its place without removing the shell from the tube plates.

Although the invention has been described with reference to specific embodiments, many variations will be apparent to those skilled in the art within the spirit and scope of the invention as defined in the following claims.

What is claimed is:

1. A method of welding tubes to a tube sheet comprising the steps of:
   inserting a tube within a hole in the tube sheet, the outside diameter of the tube being substantially equal to the inside diameter of the hole;
   expanding the tube within the hole, the area of contact between the tube and the tube sheet being sufficient to procure a tight weld joint;
   partially withdrawing the tube from the tube sheet to accurately align the tube in the tube sheet, the previous expansion of the tube within the tube sheet to tighten sufficiently the joint to accurately align the tube in the hole in the tube sheet as the tube is partially withdrawn;
   fusion welding the tube to the tube sheet along the area of contact from the inside of the tube whereby a weld bead is formed inside the tube, the depth of penetration of the tube into the tube sheet after the tube has been partially withdrawn being approximately equal to the thickness of the wall of the tube.

2. A method according to claim 1 wherein the weld bead is shielded with an inert gas to prevent oxidation of the weld head.

3. A method according to claim 1 wherein the weld bead is shielded with argon to prevent oxidation of the weld bead.

4. A method according to claim 1 wherein the step of fusion welding includes:

inserting an electrode through the side of the tube sheet opposite the joint, the electrode being located radially in the tube with the tip of the electrode spaced from the inner surface of the tube at a point along the area of contact between the tube and the tube sheet, and rotating the electrode radially about the area of contact between the tube and the tube sheet.

5. A tube to tube sheet construction comprising:

a tube sheet having opposed surfaces with a plurality of closely-spaced tube openings extending through said tube sheet from one opposed surface to the other, a plurality of tubular members having an outside diameter substantially equal to the inside diameter of said tube sheet openings penetrating into said openings a predetermined limited distance, said tubular members being expanded and aligned within said openings, and a heat-applied welded joint between each of said tubular members and said tube sheet applied from within said tubular members, the limited distance of penetration of the tubular members into the tube sheet openings after the tube has been partially withdrawn being approximately equal to the thickness of the wall of the tube.

References Cited by the Examiner

UNITED STATES PATENTS

| | | | |
|---|---|---|---|
| 874,084 | 12/07 | Jottrand et al. | 219—137 |
| 3,125,670 | 3/64 | Hawthorne | 219—125 |

RICHARD M. WOOD, *Primary Examiner.*

JOSEPH V. TRUHE, *Examiner.*